Feb. 28, 1967    J. L. WEIS    3,306,461
HYDROCYCLONE
Filed Aug. 18, 1964    3 Sheets-Sheet 1
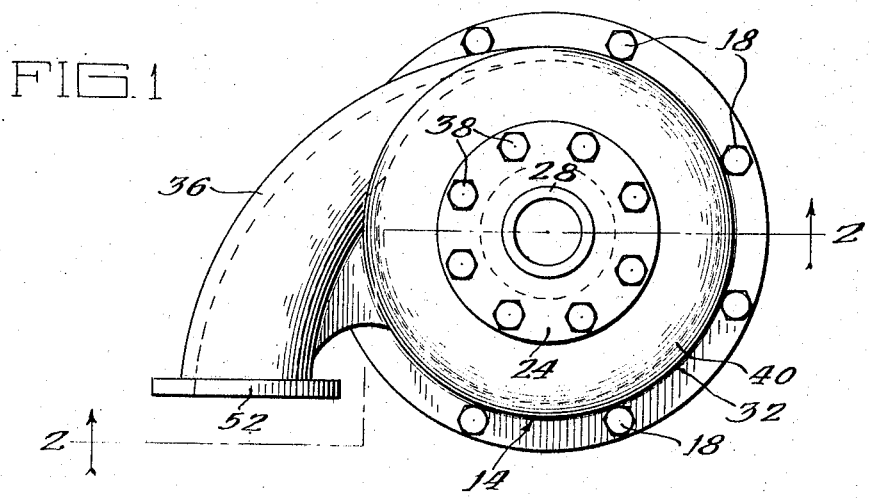
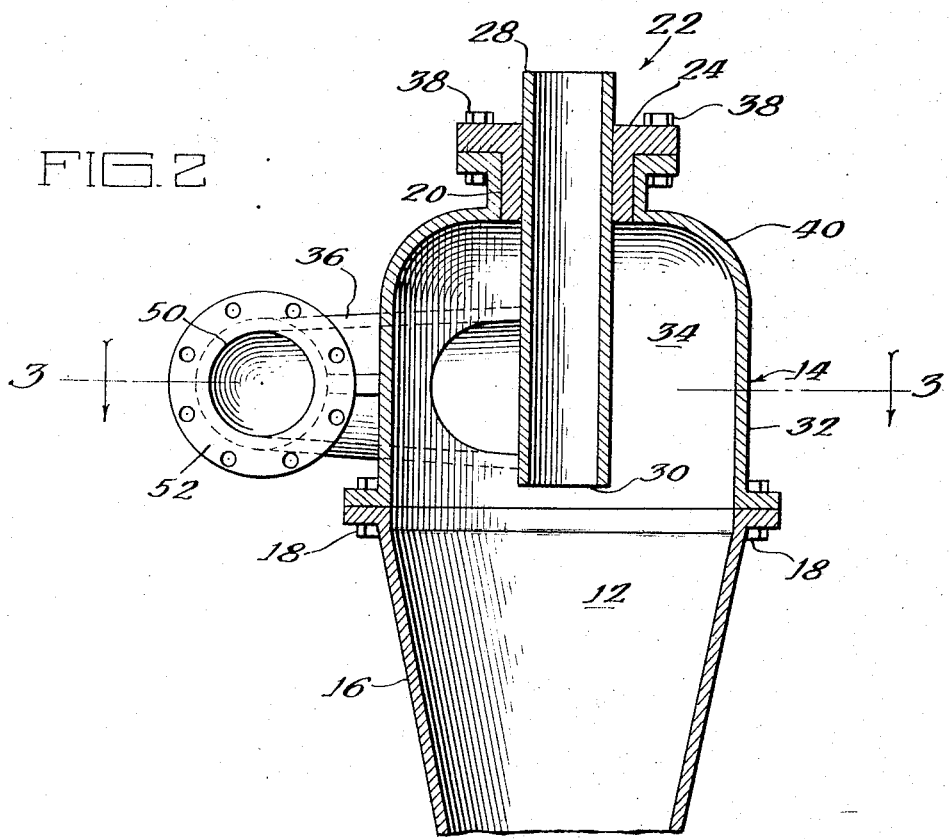
Inventor:
John L. Weis Inventor:
John L. Weis

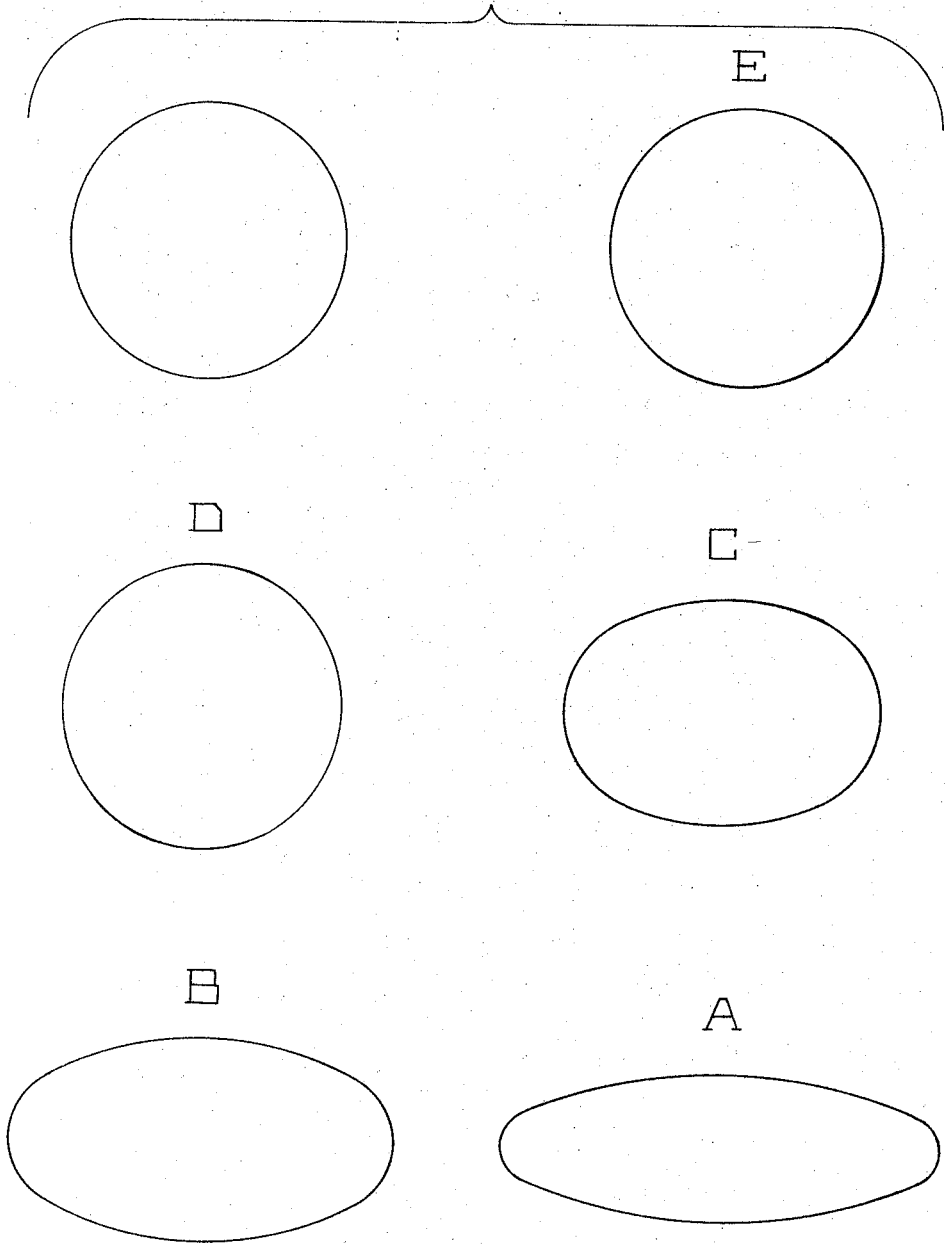

United States Patent Office 3,306,461
Patented Feb. 28, 1967

3,306,461
HYDROCYCLONE
John L. Weis, Questa, N. Mex., assignor to International Minerals & Chemical Corporation, a corporation of New York
Filed Aug. 18, 1964, Ser. No. 390,355
10 Claims. (Cl. 210—512)

This invention relates to vortex separators of the type used in the treatment of liquid suspensions of solids and slurries. In such separators, the liquid suspension is fed tangentially and at accelerated speed into the top of a vortex vessel, which may be cylindrical or conical in shape. A thickened solids slurry is removed from the bottom of the vessel, and liquid substantially free of solids is removed from the vessel upwardly through a conduit known as a vortex finder.

In vortex separators, centrifugal force draws the heavy solids to the outside of the rotating column of liquid and it is advantageous to feed the incoming material in a stream which is thin measured in the radial direction so that the solids have a relatively short distance to travel before reaching the wall of the vortex vessel. The efficiency of such vessels is a function of their ability to lay the solids content of the incoming suspension against the wall of the vessel, while the lighter liquid moves towards the center of the vessel, which is also the center of the vortex.

It has been found that improved operating efficiency is obtained by providing a vortex vessel in which substantially laminar flow of liquid is maintained and turbulence is eliminated or reduced to a minimum. It has further been found that when flow is maintained substantially free of turbulence, the life of the vessel is materially increased.

It is an object of this invention to provide a vortex separator of enhanced efficiency for the separation of the solid and liquid contents of suspension.

Another object of this invention is to provide a vortex vessel in which substantially laminar, non-turbulent fluid flow is maintained.

Another object of this invention is to provide a vortex separator of novel design in which the abrasive effects of fluid flow at high velocity are minimized, and the trouble-free, efficient life of the vessel is extended.

In brief, the objects of this invention are accomplished by providing a vortex separator comprising a vortex vessel of circular cross-section having a substantially cylindrical upper portion and a substantially conical lower portion, an outlet conduit extending upward out of the vessel from a point intermediate the length thereof, with the cylindrical upper portion of the vessel and the outlet conduit cooperating to form an annulus internally of the vessel, and a second outlet at the lower end of the vessel. A horizontal curving inlet nozzle of transitional, decreasing internal cross-section having a substantially circular initial cross-section and a vertically elongated cross-section at a substantially tangential juncture with the annulus, is provided. The inner surface of the outer wall of the nozzle is adapted to join the inner surface of the wall of the vessel to provide a substantially uninterrupted horizontal curving surface, with the inner surface of the inner wall of the nozzle terminating at the juncture with the vessel wall to provide fluid communication between the nozzle and the vessel. In accordance with more particular aspects of the invention, the nozzle provides a transition from circular cross-section to elliptical cross-section and the wall of the vortex vessel curves inwardly at the upper extremity of the vessel to provide a large radius which enhances laminar flow within the vessel.

The invention will be described in detail in reference to the drawing of which:

FIGURE 1 is a plan view of a vortex separator fabricated in accordance with this invention.

FIGURE 2 is a sectional view taken in the plane 2—2 of FIGURE 1.

Figure 3:
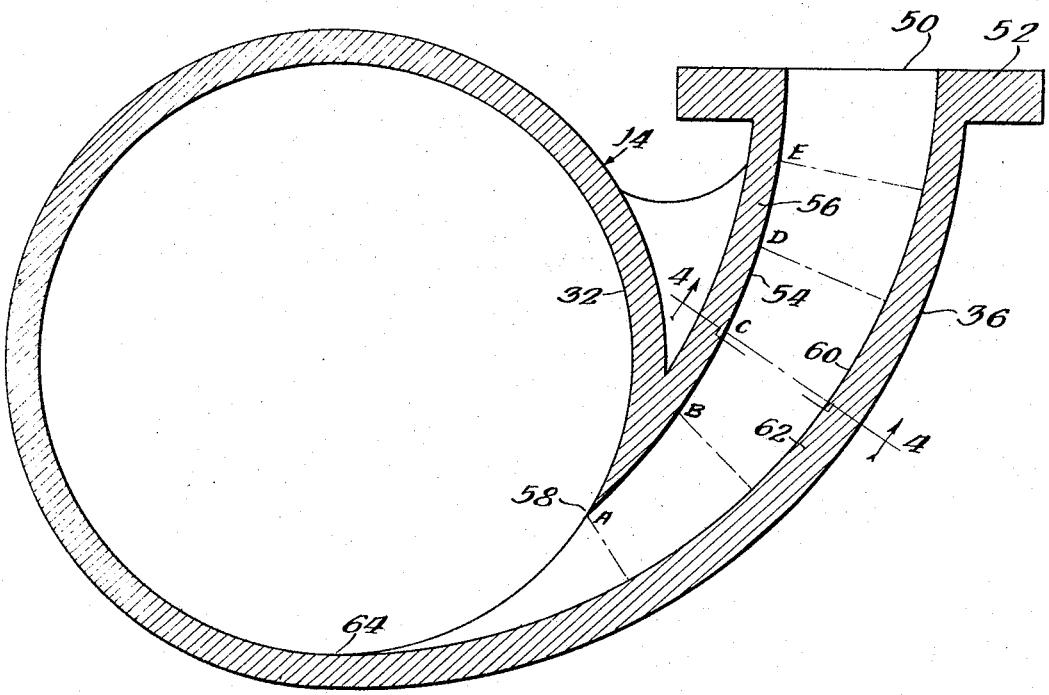
FIGURE 3 is a sectional view taken in the plane 3—3 of FIGURE 2.

FIGURE 5 comprises nozzle cross-sections taken in the planes A to E inclusive as shown in FIGURE 3.

Referring to FIGURES 1 and 2, the vortex separator comprises a vortex vessel 12 which includes a cylindrical vessel portion 14 and a conical vessel portion 16, which may be secured together by bolts 18, or which may be integrally formed portions of the vessel. The upper portion of the vessel terminates at an opening 20, which provides access to the vessel interior and is normally covered by vortex finder assembly 22. The vortex finder assembly comprises collar 24 and a conduit 28 which has a terminus 30 intermediate the ends of the vortex separator. Conduit 28 cooperates with the cylindrical wall 32 of the upper portion of the vortex vessel to form an annulus 34 between the vessel wall 32 and conduit 28. Curvilinear inlet nozzle 36, which is shown in detail in FIGURES 3 to 5, discharges into annular space 34. A plurality of bolts 38 are employed to secure the vortex finder assembly in place.

The upper extremity of the cylindrical portion of the vessel curves inwardly at 40 to form the top of the vessel. It has been found that by providing an inward vessel curvature having a radius in the range of about 0.4 to 1.0 times the radius of the vortex vessel, turbulence in the upper portion of the vessel is maintained at a minimum, with a concomitant reduction of vessel wear. It will be understood that as the radius of curve at 40 approaches the radius of the vessel, the vessel dome approaches a hemi-spherical shape. Excellent results are obtained with substantially hemi-spherical dome shapes, substantially hemi-spherical shapes being preferred for use in smaller vortex separators, say of 12″ diameter or less.

Figure 4:
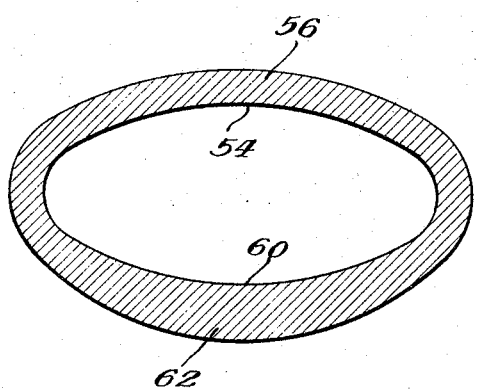
FIGURE 4 is a sectional view taken in the plane 4—4 of FIGURE 3.

Referring to FIGURES 3 to 5, the vortex vessel 14 is provided with an inlet nozzle 36 of curvilinear form and transitional cross-section. The nozzle is provided with a conventional, circular cross-section at its inlet 50. A flange 52 is provided to connect the nozzle to conventional, circular fluid conduits. The nozzle is shaped to provide a transitional internal cross-section which is circular at inlet 50 and elliptical at section A, which is the interior cross-section of the nozzle at the juncture between the nozzle and the upper portion of the vessel 14. Preferred cross-sections of the nozzle at section A and intermediate sections B to E inclusive are shown in FIGURE 5. The area at cross-section A is less than that at the flange, whereby acceleration of the fluid in the nozzle is obtained. It will be understood that the nozzle will be shaped to provide the optimum area ratios (acceleration) for the specific use intended, in accordance with the skill of the artisan.

The inner surface 54 of inner wall 56 meets the inner surface of the wall 32 of the vessel at point 58, which is the locus of nozzle section A. The inner surface 60 of the outer nozzle wall 62 is curved at 64 to blend smoothly into the inner surface of wall 32 of the vessel. In this manner laminar flow within annulus space 34 is promoted. The thickness of the outer nozzle wall 62 is increased as shown in FIGURE 4 over a substantial portion of the nozzle length. It has been found that the solids content of the incoming dispersion is laid against surface 60 of the nozzle, and that most of the abrasive wear which occurs in the vortex separator is concentrated along surface 60. It has been found that the life of the vessel can be materially extended by increasing the thickness of the external wall 62 of the nozzle as shown over a substantial portion of the nozzle length. The thickness of wall 62 may be beneficially increased to about 1¼ to 1½ times the normal thickness of the nozzle wall. Greater increases in thickness are not beneficial since the extent of wear which might make such additional thickness increase effective would so alter the interior cross-section of the nozzle as to substantially reduce the efficiency of the vortex separator in any event.

In accordance with this invention, optimum nozzle shape is obtained when the total angle of curvature of the nozzle between inlet 50 and cross-section A is about 60°, and the additional nozzle outer wall curvature between section A and the juncture of the outer nozzle wall 62 with the wall 32 of the vessel at 64 is about 30°. In FIGURE 5 typical preferred nozzle cross-sections at sections A, B, C, D and E are shown. The angle of nozzle center-line curvature between section A and section B is about 20°, and the angle between the remaining adjacent sections B to E is about 10°. Optimum dimensions for a 24″ diameter vortex separator are given in the following table:

TABLE I.—NOZZLE SECTION FOR 24″ DIA. VESSEL

| Nozzle Section | Curvature angle from inlet (total) | Major Axis (inches) | Minor Axis (inches) |
| --- | --- | --- | --- |
| E | 10° | 6.00 | 5.92 |
| D | 20° | 6.24 | 5.60 |
| C | 30° | 6.76 | 5.12 |
| B | 40° | 7.68 | 9.44 |
| A | 60° | 10.00 | 3.34 |

It will be understood that for separators of greater or smaller diameter, proportionately increased or decreased dimensions can be used. While optimum nozzle dimensions have been stated to define in detail the preferred mode of carrying out the invention, the invention should not be construed as so limited. Excellent results are obtainable using nozzle dimensions and cross-sections other than those specifically described. The nozzle must, however, provide an angle of curvature of at least about 30°, preferably 50 to 80°, between the initial inlet cross-section 50 and the cross-section A at the juncture between surface 54 of the nozzle and surface 32 of the vessel. An angle of curvature in the range of 15 to 50° must be provided between cross-section A and point 64, the juncture between surface 60 of the nozzle and the surface 32 of the vessel. Point 64 is the point at which the surface becomes circular with respect to the center of the vessel. The major axis of the cross-section at A must be greater than the diameter of circular inlet 50, and preferably is 1½ to 2 times the diameter of the inlet cross-section. The minor or horizontal axis of cross-section A is preferably 0.4 to 0.7 times the diameter at the inlet.

In operation, it has been found that when a solids slurry is introduced through nozzle 36, an initial but substantial complete separation of solids and solids-free liquid occurs within the curvilinear nozzle itself, with the result that a layer of solids is introduced into the vessel along the inner surface 60 of the outer wall 62 of the nozzle, while substantially solids-free liquid is introduced into vessel adjacent the inner surface 54 of the inner wall 56 of the nozzle. By employing a curvilinear nozzle and a smooth juncture between the nozzle surface 60 and the vessel surface 34, the direct impingement of the solids against the vessel wall is avoided, laminar flow is promoted, and the wear in the vessel is substantially reduced. Further, such wear as occurs is concentrated along the inner surface 60 of the outer nozzle wall 62, so that by providing a small amount of additional wall thickness in the outer nozzle wall 62, the life of the vessel can be substantially extended at a very minimal expenditure. Details of fabrication of the vortex separator, such as the diameter and length of the vortex finder conduit 28 and of the conical lower section of the vessel have not been defined in detail, since these features are conventional and are readily adapted by the skilled artisan for optimum results in the specific environment in which the separator will be used.

While the invention has been described in detail and with emphasis upon the preferred embodiments, it will be understood that within the scope of the appended claims the invention can be practiced other than as specifically described.

The embodiments of the invention in which an exclusive property or privilege is claimed are defined as follows:

1. In a liquid solids vortex separator comprising a vortex vessel of circular horizontal cross-section having a substantially cylindrical upper portion and a substantially conical lower portion, an outlet conduit extending upward out of said vessel at a point intermediate the length thereof, the cylindrical upper portion of the vessel and said outlet conduit cooperating to form an annulus internally of the vessel, and a second outlet at the lower end of said vessel, the improvement comprising a horizontally curving nozzle of decreasing internal cross-section having a substantially circular initial cross-section and an elliptical cross-section having a vertical major axis greater than and a horizontal minor axis smaller than the diameter of said initial circular cross-section at a substantially tangential juncture with the wall of said vessel, the inner surface of the outer wall of said nozzle joining the inner surface of the wall of said vessel to provide a substantially uninterrupted, horizontally curving surface, the said outer wall of said nozzle being about one and one-fourth to about one and one-half times the thickness of the inner wall of said nozzle, the inner surface of the inner wall of said nozzle terminating at a juncture with the inner surface of the wall of said vessel to provide fluid communication between said nozzle and vessel, said nozzle curving at least about 30° between said initial cross-section and said second mentioned juncture, and curving between about 15 and 50° between said second mentioned juncture and the terminus of the outer wall of said nozzle with the inner surface of the wall of said vessel.

2. The apparatus in accordance with claim 1 in which the inner surface of said vessel curves inwardly at a radius of 0.4 to 1 times the radius of the upper portion of said vessel to form the upper surface of said vessel.

3. The apparatus in accordance with claim 2 in which said major axis is in the range of 1.5 to 2.0 times the diameter of said initial cross-section.

4. The apparatus in accordance with claim 3 in which said minor axis is 0.4 to 0.7 times the diameter of said initial cross-section.

5. The apparatus in accordance with claim 2 in which said nozzle curves about 50 to 80° between said initial circular cross-section and said second mentioned juncture.

6. The apparatus in accordance with claim 5 in which the major axis of said elliptical cross-section is in the range of 1.5 to 2.0 times the diameter of said initial cross-section.

7. The apparatus in accordance with claim 6 in which said minor axis is between 0.4 to 0.7 times the diameter of said initial cross-section.

8. The apparatus in accordance with claim 2 in which said nozzle curves about 60° between said initial circular cross-section and said second mentioned juncture.

9. The apparatus in accordance with claim 8 in which said major axis is about 1.7 times the diameter of said initial cross-section.

10. The apparatus in accordance with claim 9 in which said minor axis is about 0.55 times the diameter of said initial cross-section.

References Cited by the Examiner

UNITED STATES PATENTS

| | | | |
|---|---|---|---|
| 2,956,683 | 10/1960 | Kinney et al. | 210—411 X |
| 3,057,476 | 10/1962 | Gilbert | 209—211 |
| 3,096,275 | 7/1963 | Tomlinson | 209—211 X |
| 3,152,078 | 10/1964 | Lavanchy | 209—211 X |
| 3,204,772 | 9/1965 | Ruxton | 210—512 |

FOREIGN PATENTS

| | | |
|---|---|---|
| 1,299,477 | 6/1962 | France. |
| 851,483 | 10/1952 | Germany. |

REUBEN FRIEDMAN, *Primary Examiner.*

J. DE CESARE, *Assistant Examiner.*